Figure 1:
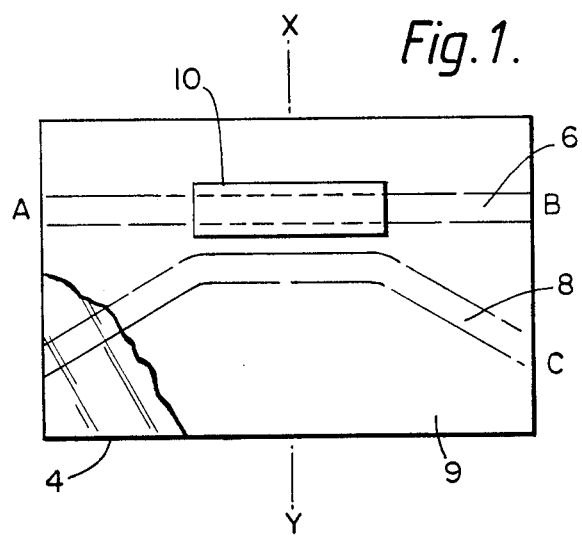

United States Patent [19]

Allen et al.

[11] Patent Number: 4,965,020
[45] Date of Patent: Oct. 23, 1990

[54] NON-LINEAR OPTICAL DEVICE

[75] Inventors: Simon Allen, Cheadle Hulme; Paul F. Gordon, Rochdale; John O. Morley, Rochdale, all of England

[73] Assignee: Imperial Chemical Industries PLC, London, England

[21] Appl. No.: 10,610

[22] Filed: Feb. 4, 1987

[30] Foreign Application Priority Data

Feb. 4, 1986 [GB] United Kingdom ............... 8602705

[51] Int. Cl.$^5$ ............................................. F21V 9/04
[52] U.S. Cl. .................................. 252/587; 252/600; 350/354; 350/364; 350/96.13
[58] Field of Search ............ 252/299.01, 299.4, 299.5, 252/582, 583, 600; 428/1; 350/350 R; 568/44, 949

[56] References Cited

U.S. PATENT DOCUMENTS

| | | | |
|---|---|---|---|
| 3,957,348 | 5/1976 | Saeva | 252/299.01 |
| 3,970,579 | 7/1976 | Taylor | 252/299.01 |
| 4,131,463 | 12/1978 | Tsuboi et al. | 430/31 |
| 4,340,264 | 7/1982 | Yamashita et al. | 428/1 |
| 4,431,263 | 2/1984 | Gavito | 264/1.4 |
| 4,748,074 | 5/1988 | Pantelis et al. | 252/582 |

FOREIGN PATENT DOCUMENTS 234751 9/1987 European Pat. Off. ............ 350/354

OTHER PUBLICATIONS

Zhmurko, O.A. et al., Dokl. Akad. Nauk. Ukr. SSR, Ser. B: Geol., Khim. Biol. Nauki, (4), 37–41, 1989.
Morley, J.O. et al., J. Chem. Soc. Perkin Trans 2, (9), 1357, 1987.

Primary Examiner—John S. Maples
Assistant Examiner—Richard Treanor
Attorney, Agent, or Firm—Cushman, Darby & Cushman

[57] ABSTRACT

Optical elements comprising a non-centrosymmetric compound comprising an electron donor and an electron acceptor linked by a conjugated bridging group, in which the electron acceptor is a nitroso group, in which element the molecules of the compound are aligned so that the element has a net non-centrosymmetry, a method for their preparation, optical devices comprising such elements, and some of the compounds.

3 Claims, 1 Drawing Sheet

U.S. Patent

Oct. 23, 1990

4,965,020

NON-LINEAR OPTICAL DEVICE

This specification describes an invention relating to optical elements and devices based thereon comprising s non-linear optical compound.

According to the present invention there is provided an optical element comprising a non-centrosymmetric compound (hereinafter referred to as "the NLO compound") comprising an electron donor and an electron acceptor linked by a conjugated bridging group, in which the electron acceptor is a nitroso group, in which the molecules of the NLO compound are aligned so that the element has a net non-centrosymmetry, which alignment is hereinafter referred to as "ordered".

A preferred NLO compound can be represented by the formula:

$$D-B-N=O \qquad \text{I}$$

in which D represents an electron donor and B is a bridging group having an electron pathway provided by a conjugated system of single and double bonds between D and the nitroso group (—N=O).

The electron donor, D, comprises an atom or group which readily gives up an electron, D', which preferably contains a sulphur, nitrogen, oxygen or phosphorus atom, preferably carrying one or more hydrogen atoms or hydrocarbon substituents. Examples of suitable donors represented by D' include —OR, —ST, —NTV, PTV in which T and V each independently represents H, alkyl, alkenyl, aryl or heteroaryl, or T & V together with the N or P atoms to which they are attached represent a hetero-aliphatic or hetero-aromatic ring, such as morpholino, piperazino, piperidino or pyridino. Specific examples of suitable groups represented by D' are $OCH_3$, $SCH_3$, $SC_6H_5$, $SC_6H_4N(CH_3)_2$, $NH_2$, $NHCH_3$ and $N(CH_3)_2$.

One or more groups represented by D' may be attached directly to the bridging group or through a linking group, L, comprising a system of conjugated double and single bonds between D' and the bridging group, such as a phenylene, naphthylene, alkenylene or alk-(polyene)-ylene group. The electron donor can thus be represented by the formula:

$$-(L)_l-(D')_m \qquad \text{II}$$

wherein L and D' are as hereinbefore defined, l is 0 or 1, and m is an integer from 1 to 3. Examples of such groups are 4-(dimethylamino)phenyl and 4-(dodecylamino)phenyl.

The bridging group represented by B is may be any suitable divalent group having a series of conjugated single and double bonds between the points of attachment of D and the nitroso group. Examples of suitable groups are arylene, e.g. phenylene, naphthylene and biphenylene; azo and groups incorporating these, e.g. —N=N— & -phenylene—N=N-phenylene-; imine and groups incorporating these, e.g. —C=N—, -phenylene—C=N-phenylene-, —N—N=C— and pyrazolin-1,3-ylene and alk(poly)enylene groups, e.g ethylene and hexa-1,3,5-trienylene. The bridging group may carry substituents preferably which do not significantly detract from the non-centrosymmetry of the molecule. Such substituents are therefore preferably substantially non-polar, such as alkyl or alkenyl, especially $C_{1-4}$-alkyl.

A preferred alka-(polyene)-ylene bridging group may be represented by the formula:

$$-CX=CR(-CR=CR)_n-CR=CY- \qquad \text{III}$$

wherein each
R independently represents H or a non-polar substituent;
X represents a group R or a second electron acceptor;
Y represents an electron donor, D, or a group R; and
n is from 0 to 28.

The non-polar substituent represented by R is preferably a monovalent hydrocarbon group, especially a $C_{1-4}$-alkyl or $C_{2-4}$-alkenyl group. The bridging group preferably contains up to thirty pairs of conjugated double and single bonds, i.e. n is from 0 to 28, and more preferably up to tan such pairs, i.e. n is from 0 to 8.

Where the groups represented by R at each end of a —C=C—unit in the bridging group are other than hydrogen they may be cis- or trans-, but are preferably trans-, with respect to each other.

Where X represents a second electron acceptor, which may be a second nitroso group or a different group such as nitro or cyano, the two electron acceptors are attached to the same terminal carbon atom of the bridging group. Likewise, where Y represents a second electron donor, the two donors, which may be the same or different, are both attached to the same terminal carbon atom of the bridging group. Examples of suitable bridging groups are phen-1,4-ylene, phen-1,2-ylene, naphth-1,4-ylene, naphth-1,5-ylene, naphth-1,8-ylene, ethen-1,2-ylene, prop-1-en-1,2-ylene, buta-1,3-dien-1,4-ylene and hexa-1,3,5-trien-1,6-ylene.

Examples of suitable compounds of Formula I are 4-nitrosoaniline, 4-nitroso-N,N-dimethylaniline, 4-nitrosoanisole, 1-nitroso-4-methylthiobenzene, 1-nitroso-4-phenylthiobenzene and 1-nitroso-4-(4-N,N,dimethylaminophenylthio)-benzene and 1-dimethylaminophenyl)-4-(4-nitrosophenyl)-buta-1,3-diene.

The molecules of the NLO compound are non-centrosymmetric by virtue of their polarisation along an axis through the the electron donor (D), the bridging group (B) and the nitroso group (—NO). A molecule of the compound can therefore be represented as a vector directed along this axis from the substituted electron donor, D, towards the nitroso group. A material, such as an optical element, comprising the NLO compound alone, or in conjunction with other substances, in which the molecules of the NLO compound are "ordered" (i.e. not randomly oriented so that the sum of the individual molecular vectors is zero) will have an overall non-centrosymmetry and thus be adapted for non-linear optical applications.

The NLO element may comprise the NLO compound of Formula I alone or it may be medium comprising a physical or chemical combination of the NLO compound of Formula I with other compounds which may or may not have NLO properties.

The NLO element may comprise the NLO compound of Formula I alone or it may be a medium comprising a physical or chemical combination of the NLO compound of Formula I with other compounds which may or may not have NLO properties.

The NLO element may comprise (i) a bulk sample of the NLO compound, such as a single crystal prepared by crystallisation from solution, from the melt, by vapour phase transport or by other known methods of crystallisation, or (ii) an chemically inert medium containing the NLO compound, such as a liquid crystal material, in which the NLO compound may be ordered by the application of a d.c. electric field. The ability of the NLO compound to form an "ordered" crystal is believed to be promoted by the presence in the molecule of a chiral atom which promotes the formation of crystals in which the molecules are "ordered" so that the bulk sample is non-centrosymmetric. It is therefore preferred that an NLO compound for use in the preparation of a single crystal NLO element contains one or more chiral atoms.

Alternatively, the NLO element may comprise a thin film of the NLO compound on a transparent or reflecting substrate, for use in waveguiding geometries well known in this field of work. The film may itself be used as a waveguide, to maximise non-linear optical interactions, or may be used as a non-linear optically-active overcoat to an active or passive waveguide. The formation of an "ordered" film comprising a series of monomolecular layer, by a Langmuir-Blodgett technique is believed to be promoted by the presence of long chains and thus a preferred class of the NLO compound has a long alkyl or alkenyl chain, preferably as one of the terminal substituents X or Y on the bridging group, or the substituent T or V in one or more of the groups represented by D' and/or A'.

The film may be formed, for example, by Langmuir-Blodgett deposition, by epitaxial crystal growth or by crystallisation of the material in a narrow cavity between two substrates.

The NLO element may be employed in optical devices which exhibit second-order non linear effects such as second harmonic generation, frequency mixing or the d.c. electro-optical effect.

Examples of non-linear optical effects using an NLO element in accordance with the present invention, in the form of a bulk sample, for example a single crystal, of the NLO compound, include:

(1) Second Harmonic Generation: A laser beam of given frequency, incident on one face of an NLO element comprising an "ordered" single-crystal of the NLO compound, at an angle parallel to the so-called "phase-matching" direction, causes the emission from the element of a coherent beam of laser radiation, at twice the frequency of the incident beam, in a direction substantially parallel to the incident beam.

(2) Electro-optical Amplitude Modulation. A polarised laser beam is directed so that it passes through a birefrequent NLO element, comprising an "ordered" crystal of the NLO compound, at an angle such that the plane of polarisation is rotated, by an angle Q, on passing through the crystal and then through a polarising medium (the 'analyser') which transmits a proportion of the beam corresponding to Q. An electric field, applied across the NLO element causes a change in the birefringence (the "d.c. electro-optic effect") of the element and a consequent change in the angle of rotation of the polarised output beam, to Q'. The proportion of the beam transmitted by the analyser now corresponds to Q'.

Where the NLO element comprises a Langmuir-Blodgett film of the NLO compound on a substrate this preferably comprises at least two monolayers of the NLO compound, in which the molecules in both layers are "ordered", and more preferably all the molecules are aligned in the same manner and such an optical element comprises a second aspect of the present invention.

By "aligned in the same manner" is meant that the vectors along the axes of polarisation in the molecules are substantially parallel and in the same sense.

It is not essential that the monolayers of the NLO compound are adjacent and it can be advantageous to separate the monolayers with intervening layers of other materials. Where the two monolayers of the NLO compound are adjacent it is preferred that the electron donors, D, of the molecules in one monolayer will be adjacent to the electron acceptors, A, in the adjacent monolayer ("head to tail" array).

Where the substrate is transparent at the wavelength of incident radiation it may be in the form of an optical waveguide on the outer surface of which the NLO compound is deposited. With this form of element an optical signal passing along the waveguide interacts with the superficial coating of the NLO compound, via the evanescent wave which extends into this coating, and gives rise to non-linear optical effects. Examples of suitable substances for a substrate in the form of a waveguide are glass, lithium niobate and silicon nitride on oxidised silicon.

Alternatively, a transparent substrate may be in the form of a plate or disc on one, or both, surfaces of which a coating of the NLO compound can be formed. With this form of element a non-linear optical effect may be obtained by transverse illumination of the substrate and film(s). Suitable substrates for such an optical element include glass, silica and polymethylmethecrylate (PMMA).

Where the substrate is reflecting it conveniently has a plane reflecting surface on which a superficial coating of the present NLO compound may be formed so that the optical signal passes through the coating immediately before and after contact with the reflecting surface. Examples of suitable materials for the reflecting substrate are aluminium, silver, or aluminium or silver films deposited on s support substrate such as glass, silica, quartz or PMMA. With this form of optical element it is possible to attain efficient non-linear processes by exciting the so called "surface plasmon" modes reported in the literature [Stegman et al, Appl. Phys. Lett. 41 (10) 906, 1982; Sand et al, Appl. Optics 21 (22) 3993, 1982].

The optical element in the form of a thin layer of the NLO compound on a substrate may be prepared by a Langmuir-Blodgett technique and according to a third aspect of the invention there is provided a method for the preparation of an optical element having non-linear optical properties which comprises passing a surface of a transparent or reflecting substrate into and out of a Langmuir trough containing a liquid carrying a superficial monomolecular layer of a compound of Formula I (the NLO compound). Where the layers of the NLO compound are not adjacent intervening layers may be formed by passing the substrate into the liquid through a surface carrying a superficial layer of the NLO compound and out of the liquid through another surface carrying a superfical layer of a different compound, or vice versa.

The liquid, hereinafter referred to as the sub-phase, is preferably an aqueous medium and the mono-molecular layer or layers are maintained in the normal manner by adjustment of the surface area with movable dams.

The optical element comprising a thin layer of the NLO compound on a substrate is adapted for the production second order non-linear optical effects in a number of ways in various optical devices.

According to a fourth aspect of the present invention there is provided an optical device comprising a non-linear optical element in accordance with the second aspect of the present invention.

An example of an optical device in accordance with the fourth aspect of the present invention, in which the optical element comprises a substrate in the form of a transparent waveguide having an intimate coating formed by multiple layers of the present NLO compound, consists of an oxidised silicon plate having a first superficial (lower) layer of silicon nitride to form a superficial plane waveguide and a second superficial (upper) layer comprising discrete monolayers of the NLO compound. In operation, a first optical signal is passed through the waveguide, (in the plane of the waveguide) and interacts with the coating, by way of the evanescent wave which extends into the coating. This interaction generates a second optical signal, at the second harmonic frequency with respect to the first optical signal, which can be detected in the combined optical signal leaving the waveguide.

Figure 2:
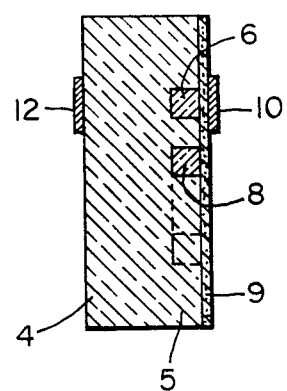

Another device in accordance with the present invention is described in relation to FIGS. 1 & 2 of the accompanying drawings, in which FIG. 1 is a plan view and FIG. 2 is a cross-section on the line X-Y in FIG. 1. In the device the optical element comprises a glass substrate, 4, in the upper surface region, 5, of which are two transparent stripe waveguides, 6 & 8, formed in the desired pattern by the well-known ion exchange or ion bombardment techniques. The stripe waveguides are positioned to run closely parallel over the central part of their length during which they are separated by a distance of a few micrometres (typically 2-5 $\mu$m). The whole surface of the substrate, 4, is coated with a film, 9, of discrete monolayers of the NLO compound. A pair of electrodes, 10, 12, connected to a power source, not shown, is arranged with one electrode, 10, above and the other, 12, below one of the stripe waveguide, 6. In operation an optical signal is passed through the first waveguide, 6, from A to B and a voltage is applied across the electrodes. This alters the refractive index of the coating, due to the d.c. electro-optic (Pockels) effect, and thus the propagation constant of the first waveguide, 6. By suitable adjustment of the applied voltage the propagation constant of the first waveguide, 6, can be arranged so that the optical signal passing through this waveguide, 6, is coupled into the second waveguide, 8, and produces a second optical signal emerging from the device at C.

The optical element of the second aspect of the present invention may be used in other known forms of optical device incorporating an optical element by replacing the conventional NLO compound used therein, e.g. lithium niobate, with the NLO compound of Formula I.

The compounds of Formula I are believed to be novel and as such form a fifth aspect of the present invention.

The compounds of Formula I may generally be conveniently prepared by the nitrosylation of known compounds or compounds which are readily and routinely preparable by analogy with or are derivable from known compounds, as illustrated in the following Example 1.

In the following Examples (which further illustrate the invention) all parts and percentages are by weight unless otherwise indicated.

EXAMPLE 1

1-nitroso-4-(4-dimethylaminophenylthio)benzene (1)

4'-Dimethylaminophenylthiobenzene(D1)(30 g) is dissolved in concentrated hydrochloric acid (100 ml); and the temperature of the solution reduced to 5° C. A solution of sodium nitrite (18 g) in water (30 ml) is added dropwise at constant temperature under stirring. After standing for 1 hr, the precipitated hydrochloride of (1) is filtered off at the pump, and washed with 50% hydrochloric acid and ethanol.

The above product (30 g) is shaken with sodium hydroxide solution (10% w/v) added until an alkaline reaction is obtained. The mixture is extracted with toluene (3×40 ml) and the combined extracts are dried ($K_2CO_3$), filtered and reduced by 50% volume and the product (1) is crystallised out.

(The starting material (D1) is a known compound).

EXAMPLE 2

The second order molecular hyperpolarisability coefficients($\beta$) of the compounds of Formula I are determined routinely using the well-known EFISH (Electric Field Induced Second Harmonic) experiment described in J. Chem. Phys., 63, 2666 (1975) on a number of solutions of the compounds at various concentrations to determine the macroscopic susceptibility (see also J. Chem. Phys., 67 446 (1979) and Phys, Rev Lett. 8 21 (1962) and using routinely determined refractive indices and dielectric constants.

What is claimed is:

1. In a nonlinear optical device comprising an optical element which is capable of exhibiting second-order non-linear optical effects, said element comprising a compound of the formula:

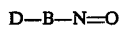

in which

B is selected from phenylene, naphthylene and biphenylene; and D is an electron donor of the formula

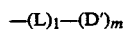

wherein

L is a benzene or naphthalene nucleus or conjugated alkylene or alkapolyene chain;

D' is selected from methoxy, methylthio, phenylthio, dimethylaminophenylthio, methylamino, and dimethylamino; 1 is 0 or 1; and m is 1, 2 or 3, said element comprising at least two monolayers of the compound of Formula I in each of which monolayers the molecules of the compound are aligned so that the element has a net non-centrosymmetry.

2. An optical device according to claim 1 wherein all the molecules of the compound of Formula I are aligned such that the vectors along the axis of polarisation in the molecules are substantially parallel and in the same sense.

3. In a nonlinear optical device according to claim 1 wherein said optical element comprises the compound 1-nitroso-4-(4-dimethylaminophenylthio)benzene.

* * * * *